INVENTOR.
Russell I. Robinson,
BY
Byron, Hume, Groen & Clement

Nov. 18, 1969   R. I. ROBINSON   3,479,541
HIGH SPEED LIQUID COOLED MOTORS
Filed Sept. 11, 1962   2 Sheets-Sheet 2
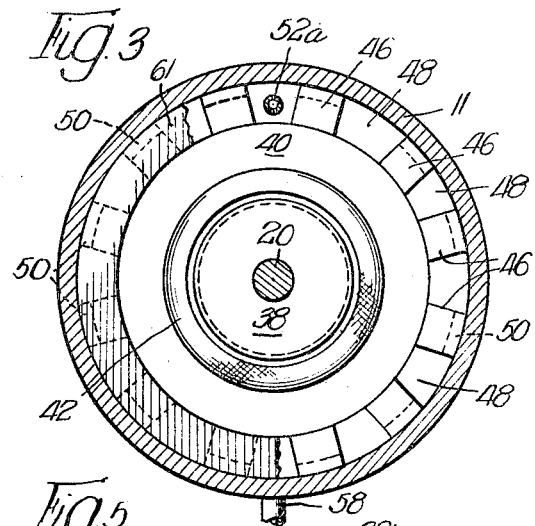
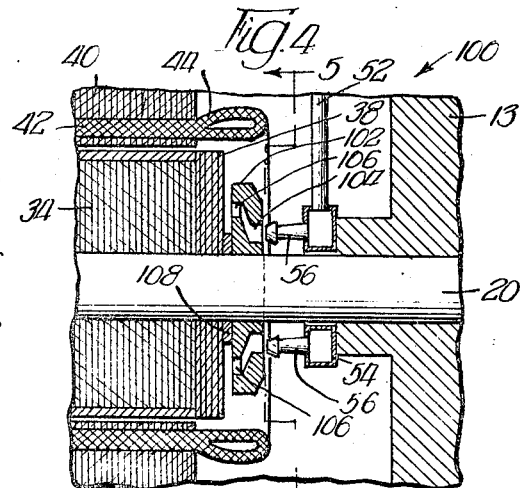
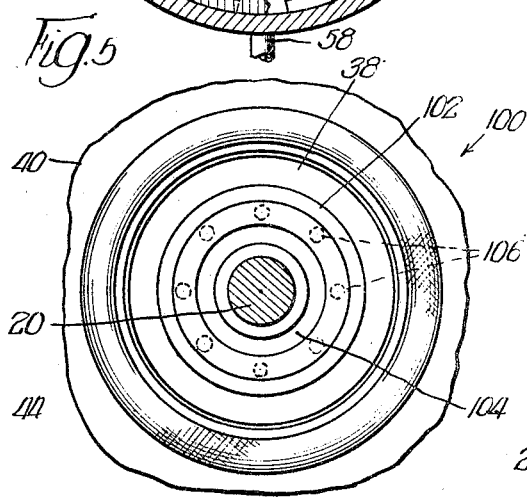
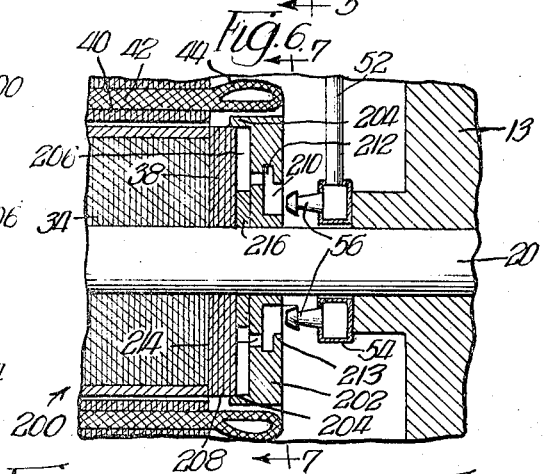
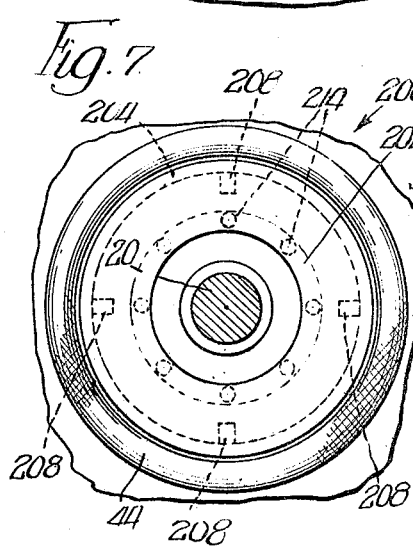
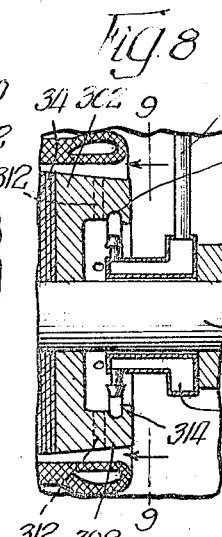
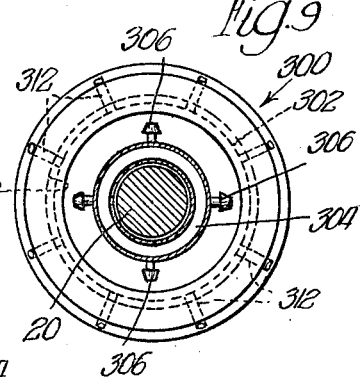
INVENTOR.
Russell I. Robinson,
BY
Byron, Hume, Groen & Clement
ATTYS.

United States Patent Office 3,479,541
Patented Nov. 18, 1969

3,479,541
HIGH SPEED LIQUID COOLED MOTORS
Russell I. Robinson, Thiensville, Wis., assignor, by mesne assignments, to The Louis Allis Company, Milwaukee, Wis., a corporation of Delaware
Filed Sept. 11, 1962, Ser. No. 222,896
Int. Cl. H02k 9/20, 9/00
U.S. Cl. 310—54       9 Claims

ABSTRACT OF THE DISCLOSURE

End rings capable of receiving and distributing a coolant spray are positioned adjacent the ends of the rotor of an electric motor. The rings are fashioned to provide good heat conduction, coolant distribtuion and coolant retention for greater cooling time.

---

This invention relates to enclosed dynamoelectric motors and more particularly to improved motor structures for liquid cooled motors.

One method for providing cooling for enclosed motors is internal use of a liquid cooling medium, including water, oil and in certain applications liquid refrigerants. While this technique has proved generally satisfactory for motors operating at moderate or low speeds, particular solutions must be sought for the more complex heating patterns developed in small, high speed motors.

It is therefore an object of the present invention to provide new and improved means for employing liquid coolant more efficiently to extract heat from high speed motors.

It is a further object of the invention to provide an improved liquid coolant distribution structure for an enclosed, hermetically sealed motor, which structure is easy to manufacture, install and maintain.

It is a still further object of the present invention to provide cooling means for an enclosed electric motor whereby the size of the motor may be reduced without sacrificing the horsepower rating of the motor.

A specific object of the invention is to provide in a motor heat sump areas at the end of the rotor and stator and to provide means for efficiently distributing liquid refrigerant over such heat sump areas to quickly withdraw the accumulated heat and to withdraw the coolant from around the stator so as to further cool the motor structure.

A more specific object of the present invention is to provide in a motor means for collecting and concentrating generated heat at available cooling areas and providing therewith means for efficiently distributing a cooling medium over the cooling areas for quickly and efficiently withdrawing the heat from the cooling areas. Means are provided to remove the cooling medium from the motor after it has been heated by such contact with the rotor, stator and field coils of the motor.

Although the present invention contemplates the cooling of motors irrespective of the machines they drive, providing that a source of cooling medium or refrigerant, such as fluorinated hydrocarbons, e.g., Freon, or water is available, the invention is particularly adapted to electric motors employed in liquid circulatory cooling systems, For instance, the invention is particularly adapted to electric motors which drive the compressor or compressors of refrigerating systems.

The invention both as to its organization and method of operation, taken with further objects and advantages thereof, will best be understood by reference to the following description taken in conjunction with the accompanying drawings, in which:

FIGURE 3 is a cross-sectional view of the motor illustrated in FIGURE 1, this view being taken along line 3—3 of FIGURE 2;

FIGURE 4 is a fragmentary longitudinal sectional view of a modified motor embodying the features of the present invention;

FIGURE 5 is a cross-sectional view of the motor illustrated in FIGURE 4, this view being taken along line 5—5 of FIGURE 4;

FIGURE 6 is a frgamentary longitudinal sectional view of another modified motor of the present invention;

FIGURE 7 is a cross-sectional view of the motor illustrated in FIGURE 6, this view being taken along line 7—7 of FIGURE 6;

FIGURE 8 is a fragmentary longitudinal sectional view of still another modified motor of the present invention; and FIGURE 9 is a cross-sectional view of the motor illustrated in FIGURE 8, this view being taken along line 9—9 of FIGURE 8.

Figure 1:
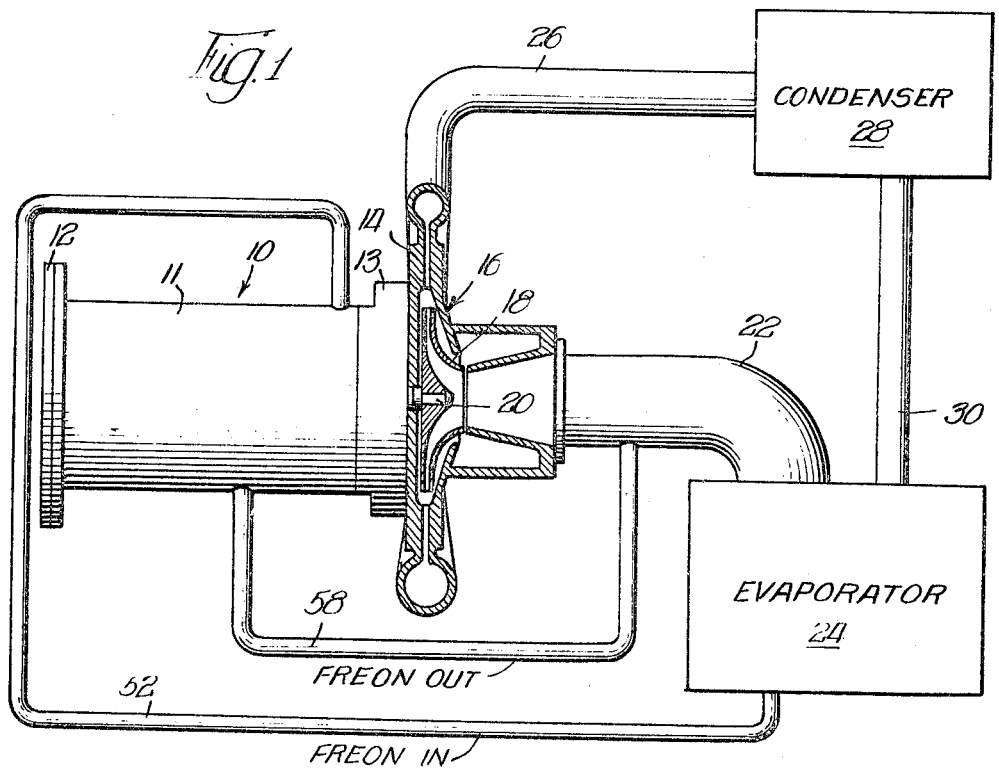
FIGURE 1 illustrates a refrigerating system equipped with a motor driven compressor and illustrating the manner in which the motor of the present invention is connected with the refrigerating system.

Referring to the drawings, and more particularly to FIGURE 1, the motor of the present invention is indicated generally by reference numeral 10 and serves as the power unit for a compressor of a refrigerating system.

The motor 10 is of the enclosed type and its housing, which comprises a cylindrical shell 11 and end walls 12 and 13, is so connected into the closed refrigerating system that running seals between rotating and stationary parts are entirely eliminated.

The end wall 13 is connected by means, not shown, to a volute 14 of a centrifugal pump 16 which serves as the compressor of the refrigerating system. An impeller 18 of the pump 16 is mounted directly upon an adjacent end of a motor shaft 20. The inlet of the pump 16 has gaseous refrigerant fed thereto by a pipe 22 which leads from an evaporator 24 of the system.

The refrigerant compressed by the pump 16 is discharged through a duct 26 into a condenser 28. In the condenser, the compressed gaseous refrigerant is cooled and liquified, for example, by passing it over a condenser coil through which cold water circulates. The condensed, liquified refrigerant then flows from the condenser through a duct 30 into the evaporator 24 wherein it is vaporized thereby chilling the liquid heat exchange medium employed in the evaporator 24.

The connection between the pipe 30 and the evaporator 24 is such that a substantially constant reserve of liquid refrigerant is maintained in the evaporator 24. Accordingly, this may be effected by a float controlled valve (not shown). The evaporator 24 is also preferably provided with a liquid eliminator or strainer (not shown) above the liquid level therein, to guard against liquid refrigerant being carried up into the pipe 22.

Figure 2:
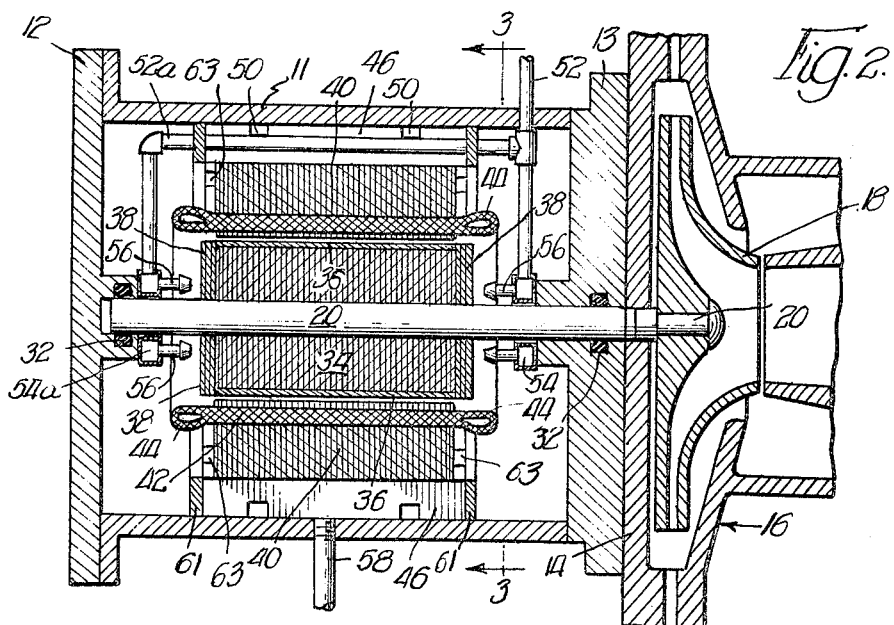
FIGURE 2 is an enlarged longitudinal sectional view through the motor shown in FIGURE 1.

Referring now to FIGURES 2 and 3 also, the motor 10 will be discussed in more detail. The motor shaft 20 is supported in the motor housing by bearings 32 mounted in the end walls 12 and 13. The shaft 20 extends through the end wall 13 of the hermetically sealed housing into the volute 14. The impeller 18 is mounted on the shaft 20 for rotating therewith in the manner discussed hereinbefore. Also mounted on the shaft 20 is a rotor 34 comprised of the customary laminations. Embracing the rotor 34, in a manner well known to the art, is a squirrel cage winding 36 mounted in slots in the periphery of rotor 34. The portions of the squirrel cage winding 36 lying in the rotor slots are connected structurally and electrically at both ends of the rotor by end rings 38 comprised of stacked, annular, heat and electrically conductive laminations, made of copper or the like. The end rings 38 serve as heat sinks to draw out the heat generated in the laminations of the rotor 34 and cage winding 36 to the ends of the rotor 34.

The rotor 34 revolves within a stator core 40, which includes the customary plurality of laminations. Extending through the stator core 40 are field coils 42 having loops 44 which extend beyond the end of stator core 40. When the field coils 42 in stator core 40 are energized, current flow in the squirrel cage winding 36 of rotor 34 is induced which results in rotation of the rotor 34 according to well known principles.

The stator core 40 is held in spaced relationship to the rotor 34 and the housing 11 by a plurality of longitudinally extending, radially disposed bars 46 positioned about the stator core 40 and held in place by suitable means not shown. The bars 46 form a series of longitudinal passages 48 around the outer periphery of the stator core 40, these passages 48 being interconnected through slots or openings 50 in the bars 46. In this manner the refrigerant may flow radially as well as longitudinally about the periphery of the stator core 40 in a manner more apparent hereinafter.

Liquid refrigerant from the evaporator 24 enters the motor 10 through an inlet pipe 52. Such refrigerant is sufficiently cold to provide cooling to the motor 10, though it will be understood that the cooling medium may be obtained from any suitable source. Within the motor 10 a branch pipe 52a branches off of the inlet pipe 52 and extends through a passage 48 between the stator core 40 and the housing 11 whereby pipes 52 and 52a supply cooling medium to the motor 10. The pipes 52 and 52a are connected to manifolds 54 and 54a, respectively, which are annular, hollow members surrounding the shaft 20 and secured to end walls 13 and 12, respectively. Extending from the manifolds 54 and 54a toward the heat conductive end rings 38 on the rotor 34 are a plurality of nozzles 56 which spray the cooling medium supplied to the manifolds 54 and 54a directly on the end rings 38. The cooling medium vaporizes upon contacting the end rings 38 and is removed from the motor 10 through an outlet pipe 58 and passed back into the system through the inlet pipe 22.

During operation of the motor 10 the refrigerant, which may be a fluorinated hydrocarbon such as Freon, enters the motor 10 in the liquid state through the inlet pipe 52 under the pressure of the refrigeration system. The manifolds 54 and 54a receive the liquid refrigerant and distribute it equally to the nozzles 56 which spray the refrigerant against the end rings 38. Upon contacting the heat conductive end rings 38, and the loops 44 of the field coil by virtue of the centrifugal force, the refrigerant flashes to a gas thereby absorbing heat from the end rings 38 and the loops 44 through its latent heat of vaporization. The heat absorption varies from around 50 to 100 B.t.u. per pound of refrigerant depending upon the particular cooling medium employed. The resultant gaseous refrigerant envelops the loops 44 of the field coils and the ends and periphery of the stator core 40 absorbing additional heat therefrom. The heat laden gas then flows around the outer periphery of the stator core 40 through the passages 48 created by the bars 46 and through the openings 50 therein down to and out of the outlet pipe 58 to the refrigeration system.

It will be understood that effective cooling of both rotor 34 and the stator core 40 is obtained in this manner. The rotor 34 is cooled principally by the vaporization of the refrigerant upon contact with the end rings 38. The stator core 40 on the other hand, is cooled by the cooling medium hitting the loops 44 of the field coils 42 and being enveloped with the cool gas which is flowing around the loops 44 of the field coils 42 and the end and outer periphery of the stator core 40. The only part of the stator core 40 not exposed to the cooling gas is the bore or air gap between the stator 40 and the rotor 32.

In a preferred embodiment of the invention annular rings 61, as shown in FIGURES 2 and 3, are secured within the housing of the motor 10 by suitable means not shown at opposite ends of and abutting with the bars 46 to partially close off the ends of the passages 48. In this manner the passages 48 communicate with the interior of the housing through inwardly directed openings 63 located between the rings 61 and the stator core 40.

It will be understood that the pressure in the pipe 22 is lower than the pressure in the interior of the motor housing when the motor 10 is operating. Thus the vapors of cooling medium are withdrawn from the motor 10 through the pipe 58 to the inlet pipe 22. In accordance with the preferred embodiment of the present invention however the rings 61 are provided such that the openings 63 in the passages 48 described hereinbefore form a ring of restricted orifices at each end of the stator core 40 through which the vaporized cooling medium must pass to get to the outlet pipe 58. These openings or restricted orifices 63 act to guide the vaporized cooling medium and insure even distribution about the ends and periphery of the stator core 40. In this manner cooling of the motor 10 is further enhanced.

FIGURES 4 and 5 illustrate a modified motor 100 of the present invention where the cooling efficiency is further enhanced. The basic construction of the motor 100 is the same as the motor 10 illustrated in FIGURES 1-3 and therefore only fragmentary views of the motor 100 are required for purposes of illustration. It will be understood that those parts of the motor 100 which are the same as the motor 10 are designated by the same reference numeral. Additional motor cooling capacity is effected in the motor 100 by retaining the cooling medium in contact with the end rings 38 at the ends of the rotor 34 for a longer period than may be obtained by spraying the refrigerant against the end rings 38 as in the motor 10. To these ends the motor 100 includes a coolant distributor 102 for retaining the refrigerant against the laminations. The coolant distributor 102 is mounted on the shaft 20 between nozzles 56 and the end rings 38. The coolant distributor 102 is an annular member having a circular groove 104 in the surface of the distributor 102 facing the nozzles 56. The groove 104 extends or flares radially outwardly and communicates at its bottom with a plurality of holes 106, which extend through the distributor 102 from the groove 104 to the surface of the distributor facing the end rings 38. The holes 106 are longitudinally extending and radially positioned about the distributor 102. A spacer 108 spaces the distributor 102 from the end rings 38.

In operation the cooling medium is sprayed from the nozzles 56 into the groove 104 of the distributor 102. The liquid cooling medium is distributed evenly within the groove 104 and moves outwardly toward the bottom of the groove 104 by virtue of the centrifugal force generated by the rotating shaft 20. The cooling medium passes through the holes 106 in the bottom of groove 104 into the space created by the spacer 108 and against the end rings 38. The cooling medium is held in proximity to the end rings 38 by the distributor 102 for a portion of its travel across the end rings 38. After traversing the end rings 38 the cooling medium is partially or wholly vaporized and is used for cooling stator core 40 and field coils 42 in the same manner discussed hereinbefore with respect to the motor 10. Preferably the distributor 102 and the spacer ring 108 are made of heat conductive material such as copper or the like whereby some cooling may be effected by the liquid while it is in the distributor 102.

More efficient cooling is effected in this modification for two reasons. Firstly, the end rings 38 are subjected to more even cooling since the number of holes 106 in the ring 102 is far in excess of the number of nozzles 56 used to spray the cooling medium on the end rings in the motor 10. In addition, the cooling medium is at least momentarily held on the end rings 38 whereas with spray cooling the actual time the coolant is in contact with the end rings 38 is very short due to the relative motion between the end rings 38 and the nozzles 56 and the centrifugal action of the rotor 40.

FIGURES 6 and 7 illustrate a further modified motor 200 wherein the time in which the cooling medium is in contact with the end rings 38 is further increased. The basic construction of the motor 200 is the same as the motor 10 illustrated in FIGURES 1–3 and therefore only fragmentary views of the motor 200 are required for purposes of illustration. It will be understood that those parts of the motor 200 which are the same as the motor 10 and the motor 100 are designated by the same reference numerals. The motor 200 has a coolant distributor 202 secured to the shaft 20 by suitable means (not shown) between the nozzles 56 and the heat conductive end rings 38. A spacer ring 216 separates the distributor 202 and the end rings 38. The distributor 202 has an annular flange 204 which extends over the end rings 38 to form a chamber 206 between the distributor 202 and the end rings 38. The end rings 38 have a plurality of slots 208 in their outer periphery whereby coolant may leave the chamber 206 under the flange 204.

The distributor 202 has an annular opening 210 in the face thereof which opposes the nozzles 56 and into which the coolant is sprayed. A radially extending groove 212, having a substantially rectangular cross-sectional configuration along the radius of the distributor 202, communicates with the annular opening 210. Communicating with the groove 212 are a plurality of longitudinally extending, radially positioned holes 214 which communicate with the chamber 206. The holes 214 are spaced slightly inwardly radially from the outer end of the groove 212 for reasons more apparent hereinafter. An annular lip 213 formed by the groove 212 prevents coolant from being sprayed directly into the passages 214. During operation the cooling medium is sprayed into the opening 210 from nozzles 56 and directed by centrifugal force to the outer edge of groove 212, which forms a reservoir for the cooling medium. When sufficient cooling medium has built up along the outer edge of the groove 212 it will spill through holes 214 into the chamber 206 and therein contact the end rings 38 to cool the rotor 34. The cooling medium is thereby wholly or partially vaporized and exits through the slots 208 to cool the stator core 40 and field coils 42 in a manner discussed hereinbefore with respect to the motors 10 and 100.

More effective cooling is provided in the motor 200 than in either of the motors 10 and 100 since the cooling medium is more evenly distributed on the end rings 38 by its being collected in the outer part of the groove 212 prior to flowing through the holes 214. Furthermore, in the motor 200 the cooling medium is held on the end rings 38 during its entire travel across them and during its passage through the slots 208. In this embodiment the manifolds 54 and 54a may be eliminated and the nozzles 56 attached directly to the inlet pipe 52, since even distribution of the cooling medium is provided for by its being collected and temporarily stored in the groove 212.

FIGURES 8 and 9 illustrate a further modified motor 300 wherein efficient cooling of the motor 300 is obtained. The basic construction of the motor 300 is the same as the motor 10 illustrated in FIGURES 1–3 and therefore only fragmentary views of the motor 300 are required for purposes of illustration. It will be understood that those parts of the motor 300 which are the same as the motor 10, the motor 100 and the motor 200 are designated by the same reference numerals.

The motor 300 has a unitary reservoir end ring 302 to which cooling medium is supplied by an inlet line 52, manifold 304 and radially extending nozzles 306. The nozzles 306 are similar to the nozzles 56 with the exception that they are radially extending as contrasted to the nozzles 56 which are longitudinally extending. Reservoir end ring 302 has an annular flange 308 extending away from the end of the rotor 34. The end ring 302 is secured to the shaft 20 by suitable means not shown and is in abutting relationship to the end of the rotor 34. The interior of the annular flange 308 has a circular groove 310 therein which serves as a reservoir for cooling medium supplied to the groove 310 by the nozzles 306. Extending radially through the annular flange 308 are a plurality of passages 312 which communicate with the interior of the flange 308 adjacent the groove 310. Reservoir ring 302 is constructed of heat conductive material such as copper or the like.

During operation of the motor 300 cooling medium is directed via the nozzles 306 to the reservoir groove 310. The cooling medium accumulates in the reservoir groove 310 and when it has accumulated sufficiently it will overflow into the passageways 312. It will be understood that the centrifugal force caused by rotation of the shaft 20, the rotor 34 and the end ring 302 maintains the cooling medium in the groove 310 until it has accumulated sufficiently to overflow therefrom and be forced through the passageways 312. An annular, radially inwardly extending lip 314 assures that the accumulated cooling medium leaving the groove 310 will travel toward the passageways 312.

As the reservoir ring 302 is heat conductive the heat generated in the rotor 34 will pass into the end ring 302 and the cooling medium in the groove 310 and the passageway 312 will remove heat from the end ring 302. The cooling medium will wholly or partially vaporize while it is in the groove 310 or the passageway 312 of the end ring. In either instance when it leaves the passageway 312 of the end ring 302 it will effect cooling of the stator core and field coils of the motor 300 in the manner described hereinbefore with respect to the motors 10, 100 and 200.

In this embodiment even distribution of the cooling medium is effected by the reservoir groove 310 and therefore only one or two nozzles 306 are required in the motor 300.

While several embodiments described herein are at present considered to be preferred, it is understood that various modifications and improvements may be made therein and it is intended to cover in the appended claims all such modifications and improvements as fall within the true spirit and scope of the invention.

What is desired to be claimed and secured by Letters Patent of the United States is:

1. In an enclosed motor having a rotor mounted on the shaft of said motor and a housing enclosing the motor, the improvement comprising heat conductive end rings mounted at the ends of said rotor and in abutting relationship therewith, said end rings being rotatable with said rotor, nozzle means in said housing positioned to spray cooling medium against said end rings whereby heat is withdrawn from said rotor through said heat conductive rings, and means to supply cooling medium to said nozzle means.

2. In the enclosed motor of claim 1 an outlet in said housing to withdraw said cooling medium from said motor.

3. In an enclosed motor adapted for use in a closed refrigeration system, said motor adapted to be cooled by liquid refrigerant therefrom, said motor having a stator and a rotor mounted on a shaft and adapted to rotate within said stator, and a hermetically sealed housing for said motor, the improvement comprising a plurality of heat conductive laminations mounted on each end of said rotor on said shaft, nozzle means in said housing positioned to spray said liquid refrigerant against said laminations, means to supply said liquid refrigerant to said nozzle means and means to withdraw said refrigerant from said motor after said refrigerant has been sprayed onto said laminations, at least a portion of said refrigerant vaporizing upon contact with said laminations.

4. The motor of claim 3 wherein said stator is mounted in spaced relationship from said housing on a plurality of longitudinally extending members to form annular passageways each communicating with said sealed housing wherein refrigerant from said nozzle means, after contacting said end rings, will envelop said stator, said longitudinal members having transverse passageways therethrough whereby said refrigerant may travel longitudinally and circumferentially about said stator.

5. In an enclosed motor including a stator and a rotor mounted on a shaft and adapted to rotate within said stator, the improvement comprising a plurality of heat conductive laminations mounted on said shaft adjacent and abutting each end of said rotor, nozzle means within said motor at each end of said rotor adapted to spray liquid cooling medium, a coolant distributor mounted on said shaft between said nozzle means and said laminations, said coolant distributors being spaced from said laminations, said nozzle means directing said cooling medium into said coolant distributor which, in turn, directs said cooling medium uniformly against said laminations whereby heat is withdrawn from said rotor, and means to withdraw said cooling medium from said motor.

6. The motor of claim 5 wherein said coolant distributor is an annular disc having an annular groove therein opening toward said nozzle means, said annular groove flaring outwardly and rearwardly in said disc and communicating with a plurality of longitudinally extending passages opening toward said laminations, said passges being radially disposed about the longitudinal axis of said shaft, whereby cooling medium from said nozzle means flows through said annular groove and said passages to contact said heat conductive laminations.

7. The motor of claim 5 wherein said coolant distributor is an annular disc having an annular flange extending toward said laminations and forming therewith an annular chamber, said disc having an annular groove opening toward said nozzle means and a radially extending groove communicating therewith forming an inwardly extending annular lip, said radially extending groove having an outermost end, a plurality of longitudinally extending, radially positioned passages communicating with said annular groove and said annular chamber, said passages being spaced radially inwardly from said outermost end of said radially extending groove, said lip preventing cooling medium from being sprayed directly into said passages whereby cooling medium flows into said annular groove, accumulates in said radial groove and overflows through said passages into said annular chamber wherein said cooling medium contacts said laminations, said laminations having a groove therein to permit said cooling medium to leave said chamber between said laminations and said annular flange.

8. In an enclosed motor including a stator and a rotor mounted on a shaft and adapted to rotate within said stator, the improvement comprising heat conductive, reservoir-type end rings mounted on said shaft at each end of said rotor, said end rings abutting said rotor and each having an annular flange extending outwardly of said rotor, said annular flanges having an interior surface with a circular groove therein, nozzle means adapted to spray cooling medium to said circular grooves, said cooling medium accumulating therein, a plurality of radially extending passages adjacent each of said circular grooves whereby refrigerant overflowing from said grooves will pass through said passages and leave said end rings.

9. In an enclosed motor adapted for use in a closed refrigeration system, said motor adapted to be cooled by liquid refrigeration therefrom, said motor having a stator and a rotor mounted on a shaft and adapted to rotate within said stator, and a hermetically sealed housing for the motor, the improvement comprising:
 a plurality of heat conductive laminations mounted on each end of the rotor shaft;
 nozzle means in said housing positioned to spray said liquid refrigerant against said laminations;
 means to supply said liquid refrigerant to said nozzle means;
 a plurality of longitudinally extending members mounting said stator in spaced relationship from said housing to form an annular chamber about said stator with a plurality of longitudinally extending passages therein;
 annular rings mounted at each end of said longitudinally extending members to form restricted openings at each end of said passages; and
 an outlet means communicating with said annular chamber to withdraw refrigerant from said chamber,
 said outlet means communicating with a source having a pressure lower than the pressure in said housing whereby said refrigerant is drawn through said restricted openings to evenly envelop said stator and enhance the cooling of said motor.

References Cited

UNITED STATES PATENTS

| 3,092,744 | 6/1963 | Stonebrook | 310—211 |
| 270,518 | 1/1883 | Vander Weyde | 310—52 |
| 994,810 | 6/1911 | Westinghouse | 310—58 |
| 1,377,325 | 5/1921 | Dunford | 310—54 |
| 2,364,000 | 11/1944 | Sawyer | 310—52 |

FOREIGN PATENTS 68,995  3/1961  India.

DAVID X. SLINEY, Primary Examiner

U.S. Cl. X.R.

310—57, 64